(12) United States Patent
Nahapetian et al.

(10) Patent No.: US 6,696,930 B1
(45) Date of Patent: Feb. 24, 2004

(54) SYSTEM AND METHOD FOR SPECIFICATION OF TRIGGER LOGIC CONDITIONS

(75) Inventors: Armen Nahapetian, Glendale, CA (US); Daniel Stuart Brower, North Hollywood, CA (US)

(73) Assignee: Teledyne Technologies Incorporated, Los Angeles, CA (US)

( * ) Notice: Subject to any disclaimer, the term of this patent is extended or adjusted under 35 U.S.C. 154(b) by 0 days.

(21) Appl. No.: 09/546,032

(22) Filed: Apr. 10, 2000

(51) Int. Cl.$^7$ .............................................. B60C 23/00
(52) U.S. Cl. ...................... 340/436; 340/506; 340/507; 340/521; 340/523; 340/588; 340/3.1; 340/5.1; 714/39
(58) Field of Search ................................ 340/436, 506, 340/507, 521, 523, 5.1, 3.1, 588; 714/39

(56) References Cited

U.S. PATENT DOCUMENTS

| | | |
|---|---|---|
| 3,745,671 A | 7/1973 | Mortimer |
| 4,312,041 A | 1/1982 | DeJonge |
| 4,409,670 A | 10/1983 | Herndon et al. |
| 4,470,116 A | 9/1984 | Ratchford |
| 4,604,711 A | 8/1986 | Benn et al. |
| 4,626,996 A | 12/1986 | Arlott |
| 4,642,775 A | 2/1987 | Cline et al. |
| 4,729,102 A | 3/1988 | Miller, Jr. et al. |
| 4,823,271 A | 4/1989 | Clark et al. |

(List continued on next page.)

FOREIGN PATENT DOCUMENTS

| | | |
|---|---|---|
| DE | 43 10 615 A 1 | 10/1994 |
| EP | 0 431 662 A 1 | 6/1991 |
| FR | 2 667 171 A1 | 3/1992 |

OTHER PUBLICATIONS

"Q 3 Nial: A Portable Interpreter For The Nested Interactive Array Language, Nial" Software Practice & Experience, vol. 19, No. 2, Feb., 1989 (111–126).

SFIM New Generation ACMS/gse for A319/A320/A321, P. Lemasson, T. Tosi, SFIM Industries, Massy, France, 2 pages, undated.

Non Procedural Flight Mode Determination, Armen Nahapetian, Teledyne Controls, Los Angeles, 2 pages, undated.

Teledyne Controls, Software Documentation, ACMS Trigger Logic Programming, Los Angeles, California, 9 pages (Jun. 1994).

GSE Operator's Reference Manual for Aircraft Condition Monitoring Systems (ACMS) and Auxilliary Data Acquisition Systems (ADAS), 14 pages (1993).

*Primary Examiner*—Daryl Pope
(74) *Attorney, Agent, or Firm*—Sidley Austin Brown & Wood LLP (57) ABSTRACT

A system for specifying a trigger logic condition, including an interface device, a simple condition editor module in communication with the interface device for permitting definition of a condition region relative to a multi-dimensional coordinate system via the interface device using a set of attribute commands, and for recognizing a multi-parameter condition associated with the condition region based on the attribute commands used to define the condition region, and a complex condition editor module in communication with the interface device for permitting definition of the trigger logic condition on the interface device as an arrangement of a plurality of tiles defining a logical relationship for the tiles according to a predefined notation, wherein at least one tile represents one of a multi-parameter condition recognized by the simple condition editor module and an action to be performed, and for recognizing the trigger logic condition associated with the arrangement based on the predefined notation.

44 Claims, 8 Drawing Sheets

U.S. PATENT DOCUMENTS

| | | |
|---|---|---|
| 4,849,893 A | 7/1989 | Page et al. |
| 4,852,031 A | 7/1989 | Brasington |
| 5,111,402 A | 5/1992 | Brooks et al. |
| 5,262,758 A * | 11/1993 | Nam et al. .................. 340/588 |
| 5,270,931 A | 12/1993 | Appleford |
| 5,392,226 A * | 2/1995 | Hamilton |
| 5,404,528 A | 4/1995 | Mahajan |
| 5,457,634 A | 10/1995 | Chakravarty |
| 5,493,497 A | 2/1996 | Buus |
| 5,761,625 A | 6/1998 | Honcik et al. |
| 5,815,152 A | 9/1998 | Collier et al. |
| 5,892,948 A | 4/1999 | Aoki et al. |
| 5,948,026 A | 9/1999 | Beemer, II et al. |
| 6,167,319 A * | 12/2000 | Harris et al. .................. 700/86 |
| 6,396,517 B1 * | 5/2002 | Beck et al. ................. 345/771 |

* cited by examiner

FIG. 5a
= (A and B) or C

FIG. 5b
= A and (B or C)

FIG. 5c
= (A and B) or (not C)

FIG. 5d
= not A and (B or C)

FIG. 5e
= ((not A) and B) or C

FIG. 5f
= A and (B or (not C))

SYSTEM AND METHOD FOR SPECIFICATION OF TRIGGER LOGIC CONDITIONS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF INVENTION

1. Field of Invention

The present invention relates generally to trigger logic conditions and, more particularly, to systems and methods for specifying and translating trigger logic conditions.

2. Description of the Background

In user programmable systems that are used in modem transportation systems, a user predetermines conditions under which certain actions are to be performed when the vehicle is in motion or preparing for motion. For example, a user may specify that an alarm is to be sounded if both the speed of the vehicle exceeds 100 mph and the brake temperature exceeds 150° C. Once the condition is specified, it may be translated to a high level computer language, which in turn is translated to a machine language for execution by an on-board computer of the transportation system. These conditions are commonly referred to as trigger logic conditions because the satisfaction of the conditions triggers the action to be performed. Such user programmable systems are popular, especially in the aviation industry, because often the person who has the relevant aviation industry knowledge to specify the appropriate conditions does not have sufficient programming experience to directly write a computer program to implement the condition.

In the past, different methods have been utilized to allow the user to specify trigger logic conditions that are automatically translated to computer program or computer-interpretable tables. One example is a semi-formal language of "if . . . then" statements. For example, a user may specify the above-described condition with a statement such as:

IF (SPEED>100 AND TEMP>150) THEN ALARM.

Figure 1:
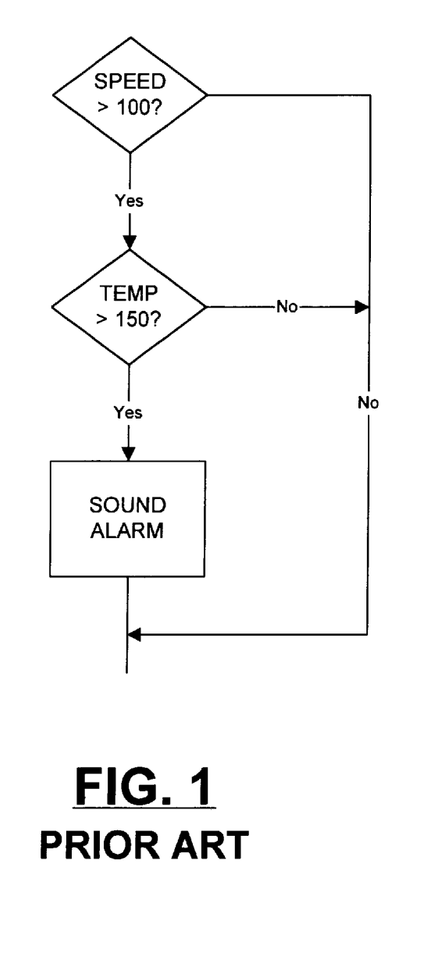
FIG. 1 is a flow chart diagram of a prior art method for defining trigger logic conditions.
Figure 2:
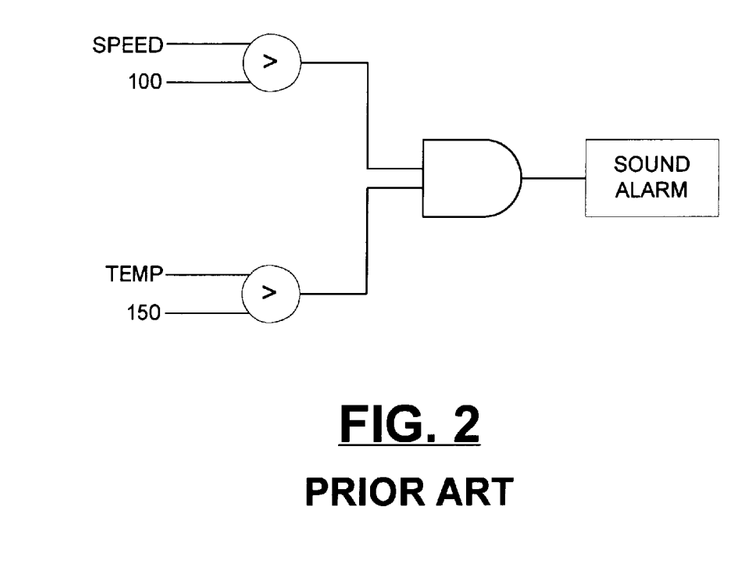
FIG. 2 is a logic diagram of a prior art method for defining trigger logic conditions.

Another known method includes using a flow chart, such as the flow chart illustrated in FIG. 1, to specify the above-described condition. A third known method includes using a logic diagram, such as the logic diagram illustrated in FIG. 2, to specify the condition. These methods, however, are based on programming techniques or electrical models, and often are not representative models of the physical phenomena that the user is attempting to define.

Accordingly, there exists a need for a system and method for users to define simple trigger logic conditions which are more representative of the physical phenomena that the user is attempting to define. There further exists a need for such a system and method which permit the specification of complex conditions comprised of, for example, simple conditions.

BRIEF SUMMARY OF INVENTION

The present invention is directed to a system for specifying a multi-parameter condition. According to one embodiment, the system includes an interface device, and a simple condition editor module in communication with the interface device for permitting definition of a condition region relative to a multi-dimensional coordinate system via the interface device using a set of attribute commands, and for recognizing the condition associated with the condition region based on the attribute commands used to define the condition region. The system may also include a translation module for translating the recognized multi-parameter condition into a computer-executable form.

According to another embodiment, the present invention is directed to a system for specifying a trigger logic condition, including an interface device, and a complex condition editor module in communication with the interface device for permitting definition of the trigger logic condition on the interface device as an arrangement of a plurality of tiles defining a logical relationship for the tiles according to a predefined notation, wherein at least one tile represents one of a condition and an action to be performed, and for recognizing the trigger logic condition associated with the arrangement based on the predefined notation. The system may also include a translation module for translating the recognized trigger logic condition into a computer-executable form.

According to another embodiment, the present invention is directed to a system for specifying a trigger logic condition, including an interface device, a simple condition editor module in communication with the interface device for permitting definition of a condition region relative to a multi-dimensional coordinate system via the interface device using a set of attribute commands, and for recognizing a multi-parameter condition associated with the condition region based on the attribute commands used to define the condition region, and a complex condition editor module in communication with the interface device for permitting definition of the trigger logic condition on the interface device as an arrangement of a plurality of tiles defining a logical relationship for the tiles according to a predefined notation, wherein at least one tile represents one of a multi-parameter condition recognized by the simple condition editor module and an action to be performed, and for recognizing the trigger logic condition associated with the arrangement based on the predefined notation. The system may also include a translation module for translating the recognized trigger logic condition into a computer-executable form.

The present invention provides an advantage over prior mechanisms for specifying trigger logic conditions because it permits specification of trigger logic conditions that are more representative of the physical phenomena that the user is attempting to define. These and other benefits of the present invention will be apparent from the detailed description hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements found in a typical computing system. For example, specific operating system details and modules contained in the processor of the system of the present invention are not shown. Those of ordinary skill in the art will recognize, however, that these and other elements may be desirable to produce a system incorporating the present invention. However, because such elements are well known in the art, and because they do not facilitate a better understanding of the present invention, a discussion of such elements is not provided herein.

Figure 3:
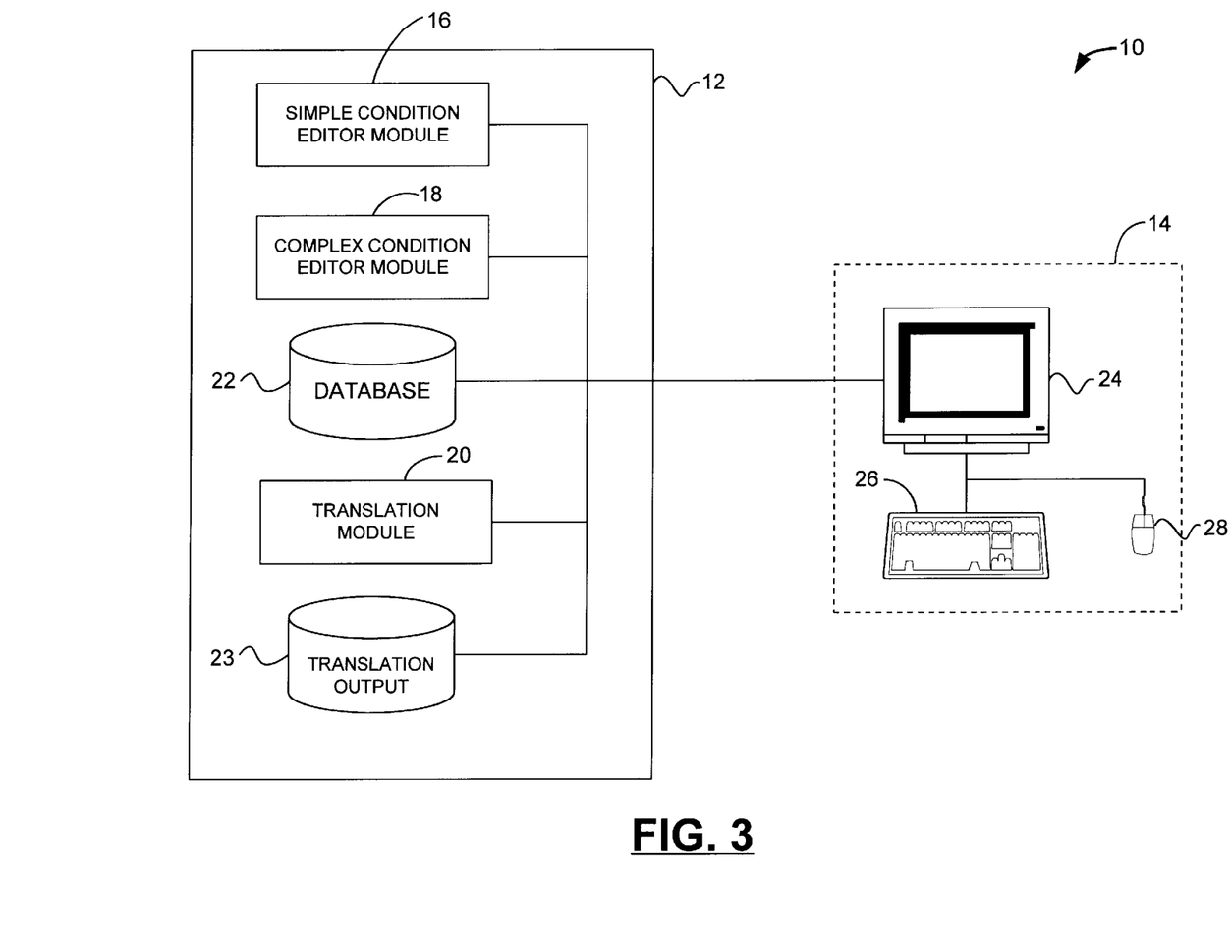
FIG. 3 is a block diagram of a system according to one embodiment of the present invention.

FIG. 3 is a block diagram of a system 10 for specifying trigger logic conditions according to one embodiment of the present invention. The system 10 includes a processor 12 and an interface device 14. As described hereinbelow, a user of the system 10 may use the interface device 14 to define simple and complex trigger logic conditions which are recognized by the processor 12 and translated to an executable form. The system 10 of the present invention may be used to define trigger logic conditions for transportation systems, however, benefits of the present invention may be realized for any application requiring specification of trigger logic conditions including, for example, medical monitoring systems.

The processor 12 may be implemented using, for example, a computer, such as a workstation or a personal computer, a microprocessor, or an application specific integrated circuit (ASIC). The processor 12 includes a simple condition editor module (SCEM) 16, a complex condition editor module (CCEM) 18, a translation module 20, a database 22, and a translation output database 23. The modules 16, 18, 20 may be implemented as software code to be executed by the processor 12 using any suitable computer language such as, for example, Visual Basic®. In addition, the software code of the modules 16, 18, 20 may use, for example, conventional or object-oriented programming techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

The interface device 14 is in communication with the processor 12, and may include a monitor 24, a keyboard 26, and a mouse 28. As described hereinbelow, the monitor 12 may perspicuously display the graphical representations of the trigger logic conditions composed according to the present invention, and the keyboard 26 and mouse 28 may be utilized to input the graphical representations of the conditions.

According to one embodiment, the simple condition editor module (SCEM) 16 permits a user of the system 10 to specify simple conditions defined according to a multi-dimensional coordinate system. The simple conditions may be, for example, two-parameter conditions defined relative to a two-dimensional coordinate system, three-parameter conditions defined relative to a three-dimensional coordinate system, etc. The user may compose the multi-parameter conditions using the interface device 14 based on a pre-defined set of attribute commands, which are recognizable by the SCEM 16. Based on the set of recognizable attribute commands, the SCEM 16 may recognize the defined multi-parameter conditions, and thereafter may store the defined conditions in the database 22.

The multi-parameter conditions may be specified as regions, called condition regions, of the coordinate system. The axes of the coordinate system may correspond respectively to the parameters of the multi-parameter condition, and may be any parameters which require monitoring, which for an aviation industry transportation system may be parameters such as, for example, time, altitude, attitude, air speed, and engine conditions such as exhaust gas temperatures, air pressure, brake temperatures, etc. The condition defined by the condition region may be satisfied when, for example, the intersection point of the parameters is within the condition region.

The condition regions may be bounded or unbounded. That is, some sides (the unbounded sides) of the condition regions may extend to infinity. In addition, the axes of the coordinate system may be absolute or relative axes. That is, if the value of the parameter is to be monitored, the axis corresponding to that parameter may be defined to be absolute, and if the change in the value of the parameter is to be monitored, the axis corresponding to that parameter may be defined to be relative.

Figure 4A:
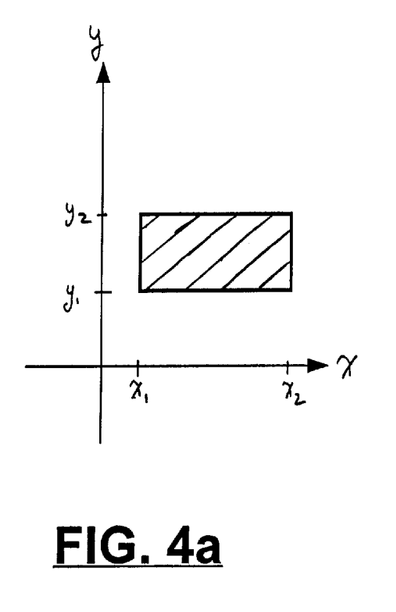
FIGS. 4a–c provide examples of two-dimensional condition regions defined with the simple condition editor module of the system of FIG. 3.
Figure 4B:
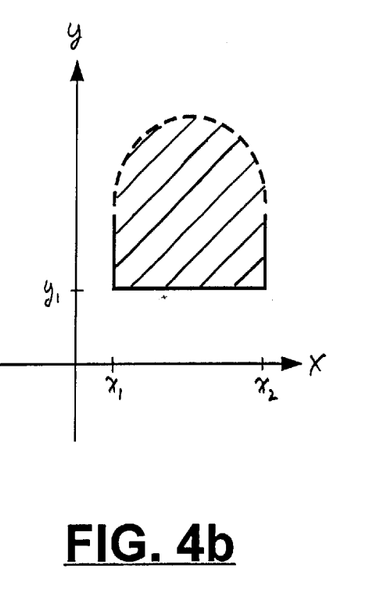
Figure 4C:
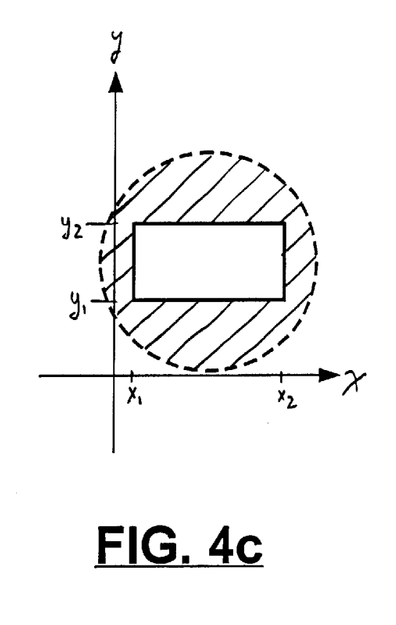
Figure 5A:
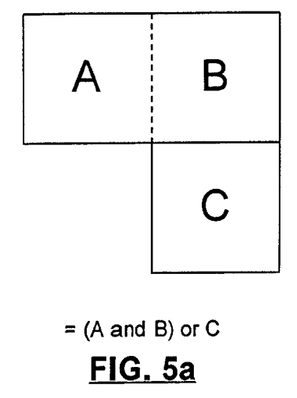
FIGS. 5a–f provide examples of trigger logic conditions defined with the complex condition editor module of the system of the FIG. 3.
Figure 5B:
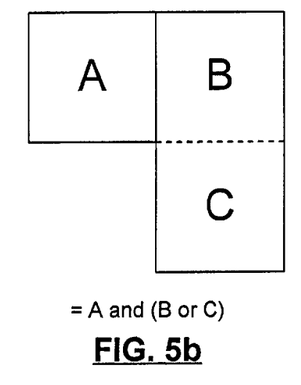
Figure 5C:
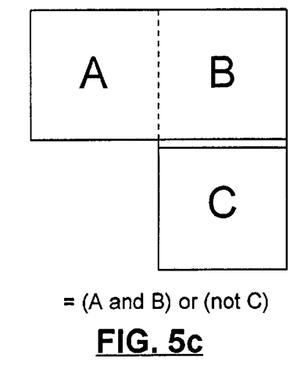
Figure 5D:
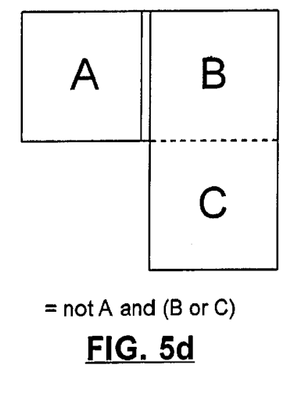
Figure 5E:
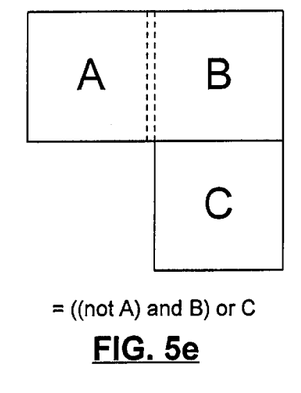
Figure 5F:
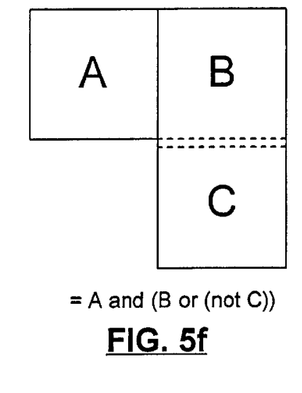

FIGS. 4a–c provide examples of types of two-parameter condition regions that may be defined by a user of the system 10 of the present invention, wherein the cross-hatched regions represent the condition regions. The dashed boundary in FIGS. 4b and 4c represent unbounded regions. According to one type of condition region, the conditions represented in FIGS. 4a–c may be satisfied any time the intersection of the respective parameters represented by the x and y axes is within the condition region.

According to a different type of condition region, the condition may be satisfied whenever the intersection point of the parameters remains within the condition over the range of parameters defined by the condition region. For example, assume that for each of the x-y coordinate systems shown in FIGS. 4a–c, the y axis represents speed in mph and the x axis represents relative time. According to such an example, the condition region shown in FIG. 4a may be satisfied when the speed is between $y_1$ and $y_2$ for the time span $x_1$ to $x_2$; the condition region shown in FIG. 4b may be satisfied if the speed is greater than $y_1$, for the time span $x_1$ to $x_2$; and the condition region shown in FIG. 4c may be satisfied when the speed is not between $y_1$ and $y_2$ for the time span $x_1$ to $x_2$.

Figure 6A:
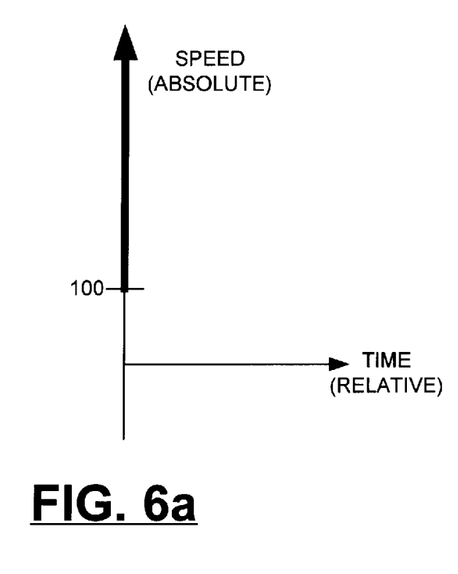
FIGS. 6a–c provide diagrams of conditions used to specify an example trigger logic condition according to one embodiment of the present invention.
Figure 6B:
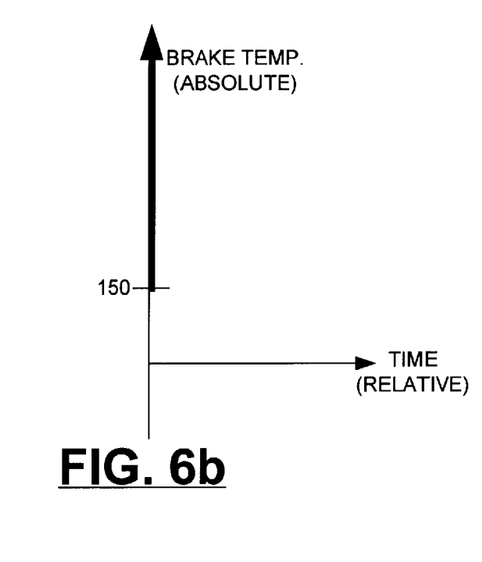

It should be noted that conditions relative to a particular parameter, such as temperature, may be specified by designating one of the axes of the coordinate system as that parameter and defining the dimension of the condition region with respect to the other axis to be infinitely small, such as illustrated in FIGS. 6a–b, described further hereinbelow.

According to another embodiment, the condition regions may be defined to capture the manner in which the parameters "enter" and "exit" the condition region. For example, referring to FIG. 4a, the condition region may be defined such that the condition is satisfied if the speed is less than $y_1$ at time $x_1$, enters the range $y_1$ to $y_2$ after time $x_1$, and remains within the range $y_1$ to $y_2$ until time $x_2$. This may be referred to as an "enter low" condition, and is distinguished from the condition regions described hereinbefore because satisfaction of the condition is contingent upon the manner in which the condition "enters" the condition region. Similarly, an "enter high" condition may be defined. According to another example, the condition region may be defined such that the condition is satisfied if the speed is within the range of $y_1$ to $y_2$ at time $x_1$ and exceeds the speed $y_2$ before time $x_2$. This may be referred to as an "exit high" condition. Similarly, an "exit low" condition may be defined. In addition, similar enter and exit conditions may be defined for the condition regions shown in FIGS. 4b and 4c, as well as for conditions based on three or more parameters.

In addition to such enter and exit conditions, "enter/exit" conditions may also be specified. For example, again referring to FIG. 4a, the condition region may be defined such that it is satisfied if the speed is less than $y_1$ at time $x_1$, exceeds $y_1$ after time $x_1$, and exceeds speed $y_2$ at time $x_2$. This may be referred to as an "enter low/exit high" condition. According to another example, the condition region may be satisfied if the speed is greater than $y_2$ at time $x_1$, is less than $y_2$ after time $x_1$, and is less than speed $y_1$ at time $x_2$. This may be referred to as an "enter high/exit low" condition. Similar conditions may be defined with respect to the condition regions shown in FIGS. 4b and 4c, as well as for conditions based on three or more parameters.

Accordingly, the SCEM 16 may permit a user of the system 10 to compose a multi-parameter condition by graphically defining the attributes of the corresponding condition region with respect to a multi-dimensional coordinate system using the interactive device 14. The user may use the keyboard 26 and the mouse 28 to define the condition regions, which are displayed on the monitor 24, with predetermined attribute commands which are recognized by the SCEM 16. The set of attribute commands may contain commands, as described hereinbefore, with respect to the boundaries of the condition regions, the dimensions of condition regions, entry/exit restrictions, and the types of axes of the coordinate system.

According to one embodiment, the dimensional attributes of the condition regions may be defined textually, graphically, or by a combination of both. To textually specify the dimensional attributes of the condition region, the SCEM 16 may allow the user to enter the coordinates of the condition region on the keyboard 26. To graphically specify the dimensional attributes, for example, the SCEM 16 may allow a user to drag, stretch, or paint a particular shape on the monitor 24 with the mouse 28, as is known in the art. In addition, to define whether particular sides of the shape are bounded or unbounded, the SCEM 16 may allow the user to use different types of lines such as, for example, solid and dashed lines, to represent bounded or unbounded dimensions, respectively.

Further, the SCEM 16 may permit the user to define absolute and relative axes by using lines with different characteristics, such as different axis ends (e.g., arrows and non-arrows), different colors and different types of lines (e.g., solid and dashed), to represent absolute and relative axes, respectively. Alternatively, the SCEM 16 may permit the user to textually enter the type of axis with the keyboar d 26 or select the type with the mouse 28 from a drop-down window displayed on the monitor 24. Moreover, the SCEM 16 may permit that user to specify the parameters represented by the axis either textually via the keyboard 26, or graphically via the mouse 28 using, for example, drop-down windows. In addition, to specify the different types of condition regions (e.g., enter, exit, and enter/exit restrictions as described hereinbefore), the SCEM 16 may permit the user to specify the different types of condition regions using either the keyboard 26 or the mouse 28. To distinguish the different types and attributes of regions on the monitor 24, different colors or different cross-hatching may be utilized to represent the different types of condition regions.

The system 10 of the present invention may permit the user to specify one or a multitude of multi-parameter conditions, depending on the particular application. The monitor 24 may display the multi-dimensional coordinate systems, and the user may define the condition regions, as described hereinbefore, using either the keyboard 26 or the mouse 28 to enter the appropriate attribute commands. Based on the set of recognizable attribute commands, the SCEM 16 recognizes the condition corresponding to the defined condition regions, and stores the entered information in the database 22.

The complex condition editor module (CCEM) 18 may be used to specify trigger logic conditions according to a predefined notation, which are recognized by the CCEM 18 based on the predefined notation, and entered into the database 22. The trigger logic conditions may include a number, or a "mosaic", of simple, multi-parameter conditions, or a mosaic of combined conditions, called nesting of conditions. The trigger logic condition may also include action conditions specifying actions to be performed upon satisfaction of the conditions. The mosaic of conditions may be defined, for example, as a virtual grid of tiles extending in two directions. The combination and arrangement of the tiles may be used to represent a specific logical relationship of conditions, which may be satisfied according to the value of each tile and their relationship to the other tiles in the arrangement.

According to one notation, the logical relationship represented by the arrangement of tiles is determined by reading the tiles generally from left to right and top to bottom. Adjacent tiles in a horizontal relationship having a first line type therebetween, such as a single line, may be defined to have an AND logical relationship, and adjacent tiles in a vertical relationship also having the first line type therebetween may be defined to have an OR logical relationship. A second line type, such as a double line, between adjacent tiles (either horizontal or vertical) may represent an inversion relationship. That is, according to one embodiment, a double line between adjacent tiles may indicate the inversion of either the tile to the left or of the tile below. In addition, a third type of line, such as a dashed line, may represent a precedential relationship. That is, a dashed line between adjacent tiles may represent a higher precedence in the logical relationship. It should be noted that according to such an exemplary notation, a line between adjacent tiles may have a combination of these line types, and hence correspond to a combination of characteristics, such as double dashed lines.

FIGS. 5a–f provide examples of different trigger logic conditions definable with the CCEM 18 using the above-described exemplary notation. According to such a notation, the trigger logic condition shown in FIG. 5a corresponds to the logical relationship "(A and B) or C)" given the dashed line between the horizontally adjacent tiles A and B. The condition shown in FIG. 5b corresponds to the logical relationship "A and (B or C)" given the dashed line between the vertically adjacent tiles B and C. The condition shown in FIG. 5c corresponds to the logical relationship "(A and B) or (not C)" given the dashed line between the horizontally adjacent tiles A and B and the double solid lines between vertically adjacent tiles B and C. The condition shown in FIG. 5d corresponds to the logical relationship "not A and (B or C)" given the double solid lines between the horizontally adjacent tiles A and B and the dashed line between vertically adjacent tiles B and C. The condition shown in FIG. 5e corresponds to the logical relationship "((not A) and B) or C" given the double dashed lines between the horizontally adjacent tiles A and B. The condition shown in FIG. 5f corresponds to the logical relationship "A and (B or (not C))" given the double dashed lines between the vertically adjacent tiles B and C. Of course, other logical relationships than those illustrated in FIGS. 5a–f may be defined using this notation. In addition, the same logical relationships may be defined using a different notation.

The trigger logic condition defined by the arrangement of tiles is satisfied if the logical relationship represented by the arrangement (or mosaic) of tiles is satisfied. According to one embodiment, each tile included in the arrangement may represent, for example:

- a simple, multi-parameter condition specified using the SCEM 16, as described hereinbefore, which if satisfied results in a True (or first binary) value, and if not satisfied results in a False (or second binary) value;
- an action to be performed, which if performed successfully results in a True value, otherwise results in a False value;
- a condition or an action described according to another notation, such as a programming language, resulting in a True or False value;
- a mosaic of combined conditions, resulting in a True or False value; or
- a "repeat" tile, which appears as a True value to its horizontal neighbor tiles, and a False value to its vertical neighbor tiles.

The CCEM 18, according to one embodiment of the present invention, may permit a user of the system 10 to define the type of tiles in the arrangement either textually or graphically. For example, the CCEM 18 may employ drop-down windows to allow the user to specify the type of tile such as, for example, a simple condition composed with the SCEM 16, an action to be performed, another mosaic of combined conditions, a condition described according to another notation, or a "repeat" tile. Once the type of tile is specified, the CCEM 18 may allow the user to define the conditions of the tile. For example, for a tile associated with a multi-parameter condition defined with the SCEM 16, the CCEM 18 may allow the user to associate the tile with the corresponding condition by entering an identifying code for the condition with the keyboard 26 or dragging the graphical representation of the multi-parameter condition displayed on the monitor 24 to the tile with the mouse 28. Similarly, the user may associate a mosaic of combined conditions with a particular tile. For an "action to be performed" tile, the CCEM 18 may allow the user to enter the action associated with the tile with the keyboard 26 or select an action with the mouse 28 from a predefined list of actions displayed on a drop-down window.

A particular tile may be defined to have succeeded, according to one embodiment of the present invention using the above-described exemplary notation, if one of the following is true:

- there is no tile on the left and the tile value is True;
- the tile on the left has succeeded and the tile value is True;
- the tile below has succeeded and there is no tile to the left;
- the tile below has succeeded and there is a dashed line to the left; or
- the tile below has succeeded and the tile to the left has succeeded.

If the tile specifies an action to be performed, the specified action is to be performed, according to an embodiment of the invention using the above-described exemplary notation, if one of the following is true:

- the tile to the left has succeeded;
- the tile below has succeeded and there is no tile to the left;
- the tile below has succeeded and there is a dashed line to the left; or
- the tile below has succeeded and the tile to the left has succeeded.

Using a predetermined notation, such as the above-described exemplary notation, the CCEM 18 may permit a user of the system 10 to compose trigger logic conditions, which, based on the predetermined notation, are recognized by the CCEM 18 and stored in the database 22. For example, once the tiles have been specified, such as described hereinbefore, the CCEM 18 may permit the user to arrange the tiles on the monitor 24 and to provide, for example, certain types of lines between the tiles to specify the desired logical relationship between the tiles, wherein the arrangement and lines have a predetermined meaning recognizable by the CCEM 18. According to other embodiments of the present invention, the CCEM 18 may be programmed to recognize notations other than the described exemplary notation, such as another predefined notation or a user-defined notation.

For an example of how the system 10 may be used to compose a trigger logic condition, consider the example described hereinbefore, particularly, that if the speed exceeds 100 mph and the brake temperature exceeds 150° C. then an alarm is to be sounded. To implement such a trigger logic condition, a user of the system 10 may compose the conditions shown in FIGS. 6a–c. FIGS. 6a and 6b illustrate simple two-parameter conditions specified with the SCEM 16. For each defined simple condition, the x axis is defined to represent relative time. For the condition shown in FIG. 6a, the y axis is defined to be absolute speed (in mph), and the condition region is defined as an unbounded line extending along the y-axis from the x-y coordinate (0, 100) to infinity. Accordingly, any time the speed exceeds 100 mph, the condition specified in FIG. 6a is satisfied. Similarly, the y axis for the condition specified in FIG. 6b is defined to be absolute brake temperature (in degrees C), and the condition region is defined as an unbounded line extending along the y-axis from the x-y coordinate (0, 150) to infinity. Accordingly, any time the brake temperature exceeds 150° C., the condition specified in FIG. 6b is satisfied.

Figure 6C:
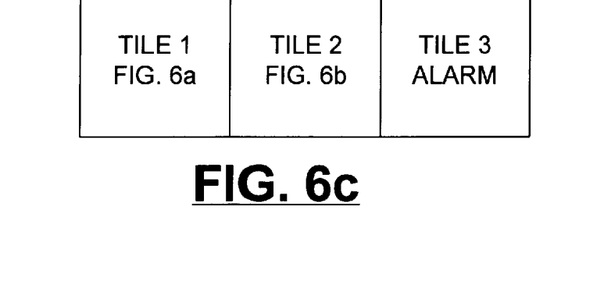

FIG. 6c provides a trigger logic condition defined with the CCEM 18 to implement the appropriate logical relationship for the example. Tile 1 corresponds to the condition specified in FIG. 6a and Tile 2 corresponds to the condition specified in FIG. 6b. Tile 3 is defined to be the action of sounding the alarm. Thus, using the above-described exemplary notation, because Tiles 1, 2, and 3 are in a horizontal relationship (representing an AND relationship) and because single solid lines are provided between the respective tiles, the action specified for Tile 3 is to be performed when both the conditions associated with the Tiles 1 and 2 are satisfied.

Figure 7A:
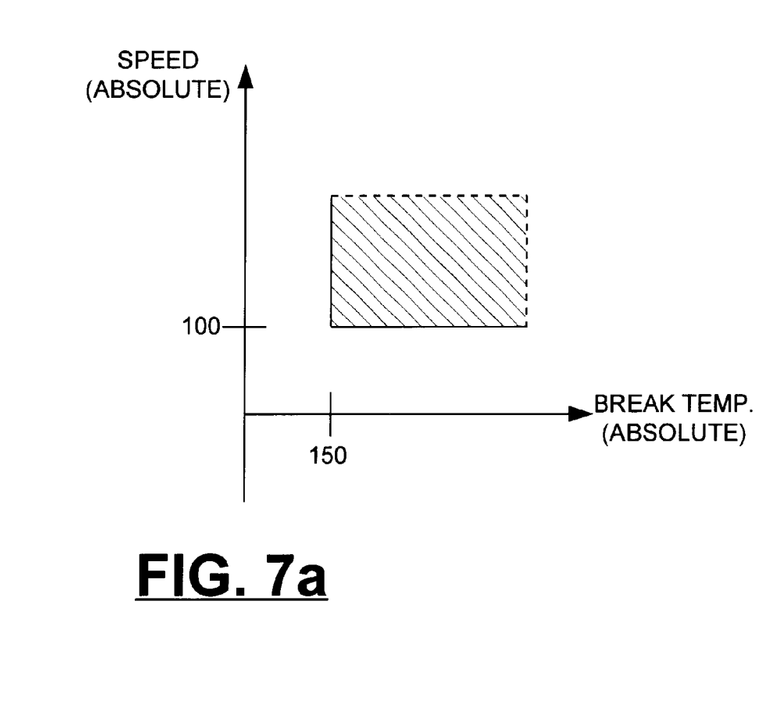
FIGS. 7a–b provide diagrams of other conditions used to specify the example trigger logic condition of FIGS. 6a–c.
Figure 7B:
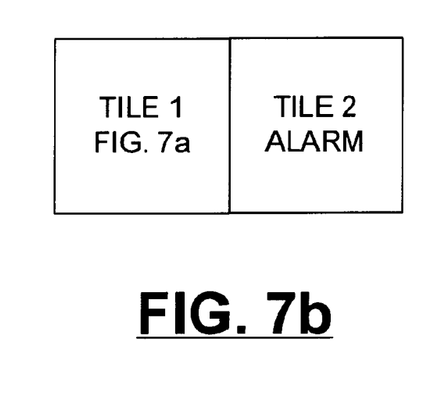

FIGS. 7a–b provide another example of how the trigger logic condition of the above-described example may be implemented using the system 10 of the present invention. A user of the system 10 may compose the simple, two-parameter condition illustrated in FIG. 7a, where the y axis represents absolute speed (in mph) and the x axis represents absolute brake temperature (in degrees C). The condition region may be defined, as illustrated in FIG. 7a, as having a corner at the x-y coordinate (150, 100) and extending unbounded in both the positive x and positive y directions. In this case, no entry/exit restrictions are necessary, such that whenever the intersection point of the two parameters is within the condition region, the condition is satisfied. Accordingly, the condition region is satisfied any time the speed exceeds 100 mph and the brake temperature exceeds 150° C.

FIG. 7b provides the trigger logic condition defined with the CCEM 18, where Tile 1 corresponds to the simple condition illustrated in FIG. 7a, and Tile 2 corresponds to the action of sounding the alarm. Because Tiles 1 and 2 are in a horizontal relationship which, according to the above-described exemplary notation, represents an AND logical relationship, the action specified by Tile 2 will be performed when Tile 1 is satisfied.

Figure 8A:
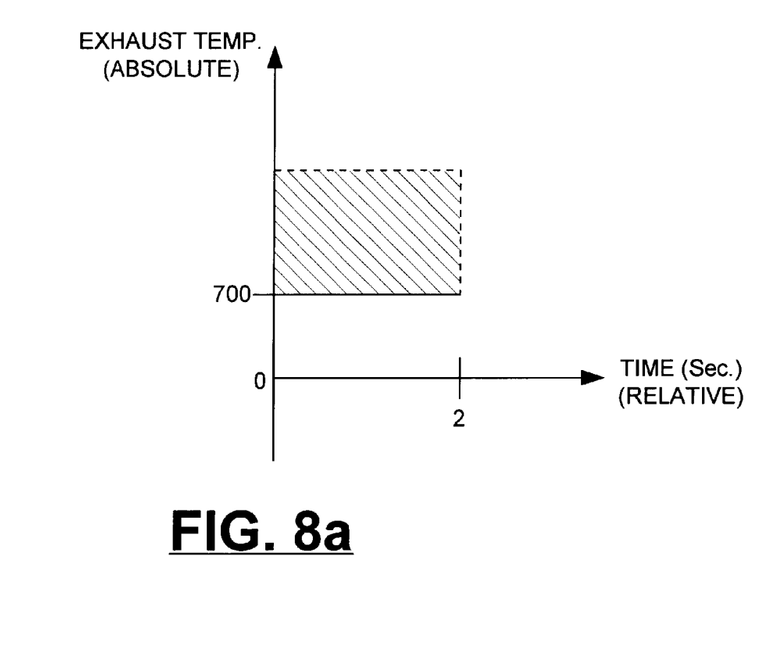
FIGS. 8a–b provide diagrams of conditions used to specify another example of a trigger logic condition according to one embodiment of the present invention.
Figure 8B:
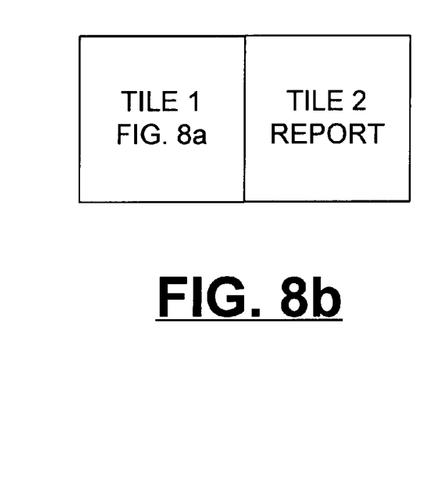

FIGS. 8a–b provide an example of how the system 10 of the present invention may be used to compose a trigger logic condition such as if the exhaust gas temperature exceeds 700° C. for a period of two seconds, then a report is to be generated. The simple, two-parameter condition shown in FIG. 8a may be composed with the SCEM 16 by defining the x-axis to be relative time (in seconds) and the y-axis to be absolute exhaust gas temperature (in degrees C). In addition, the dimensional attributes of the condition region may be specified as having corners at the x-y coordinates (0,700) and (2,700), and the upper "edge" of the condition region being unbounded. Further, the condition region may be defined using an exit restriction on the x axis (right-hand edge of the region) such that the condition corresponding to the condition region is satisfied whenever the exhaust gas temperature exceeds 700° C. over the entire two second window. FIG. 8b provides the trigger logic condition defined with the CCEM 18, where Tile 1 corresponds to the simple condition illustrated in FIG. 8a, and Tile 2 corresponds to the action of generating a report. Because Tiles 1 and 2 are in a horizontal relationship which, according to the above-described exemplary notation, represents an AND logical relationship, the action specified by Tile 2 will be performed when Tile 1 is satisfied.

The translation module 20 may translate the multi-parameter conditions stored in the database 22 by the SCEM 16 or the trigger logic conditions stored in the database 22 by the CCEM 18 to a high level computer language such as, for example, COBOL, C or C++, and store the translated output in the database 23. The high level code may then be downloaded, for example, to a transportation system, where it may be translated to a machine language code for execution by an on-board computer of the transportation system. According to another embodiment, the translation module 20 may translate the conditions stored in the database 22 to computer-interpretable tables which are stored in the translation output database 23. According to another embodiment, the translation module 20 may directly translate the conditions stored in the database 22 to a machine language code suitable for execution by the on-board computer of the transportation system. The machine language may also be stored in the translation output database 23.

Figure 9:
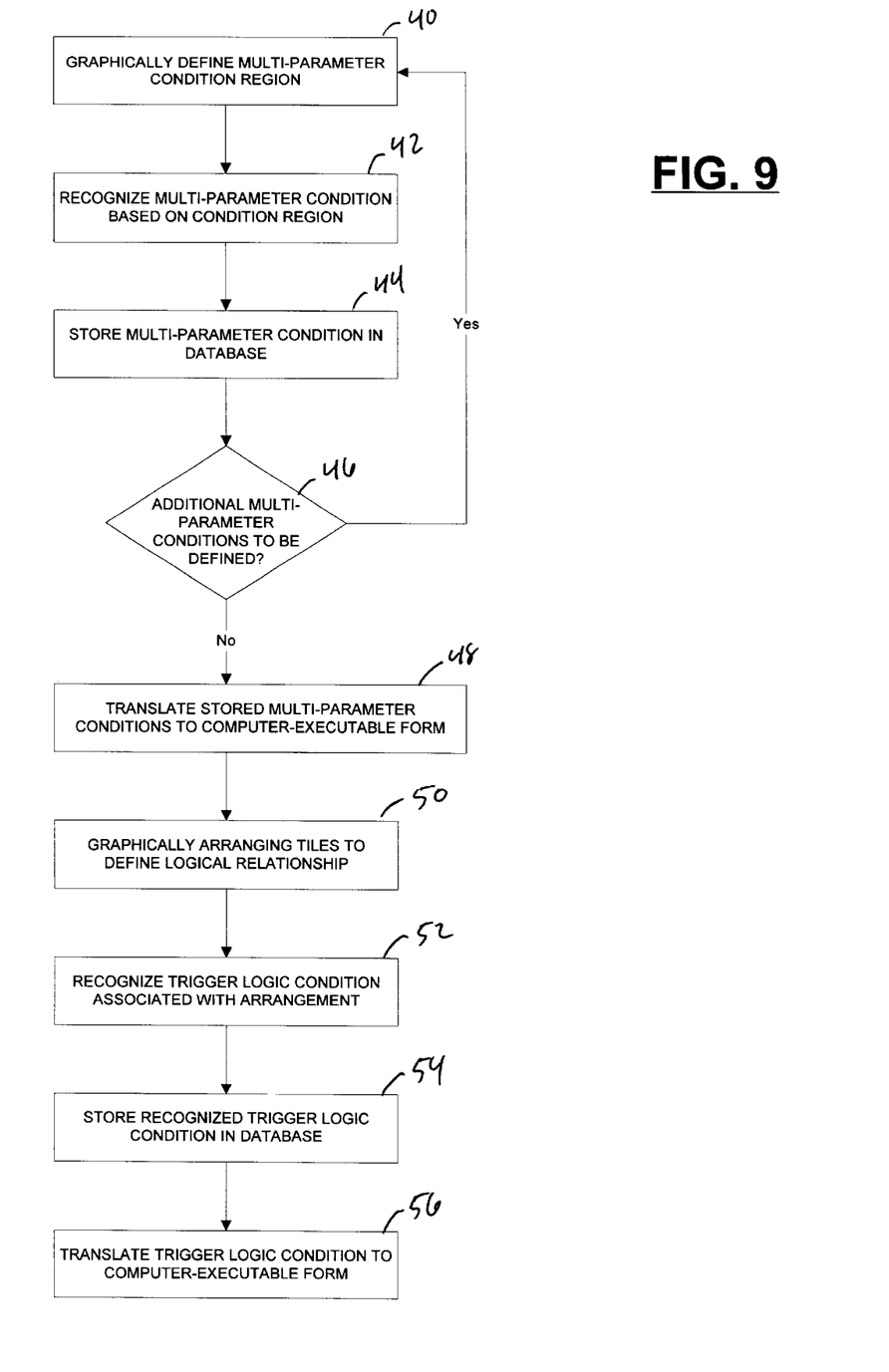
FIG. 9 is a diagram of the process flow through the processor of the system of FIG. 3 according to one embodiment of the present invention.

FIG. 9 is a diagram of the process flow through the processor 12 of the system 10 according to one embodiment of the present invention. The process begins at block 40, where a multi-parameter condition is graphically defined on the interface device 14 with the SCEM 16. From block 40, the process advances to block 42, where the SCEM 16 recognizes the multi-parameter condition based on the attribute commands used to graphically define the condition region. From block 42, the process advances to block 44, where the SCEM 16 stores the recognized multi-parameter condition in the database 22. From block 44, the process advances to block 46, where it is determined whether additional multi-parameters conditions are to be defined with the SCEM 16. If additional multi-parameter conditions are to be defined, the process flow returns to block 40. Otherwise, the process advances to block 48, where the multi-parameter conditions stored in the database 22 are translated to a computer-executable form by the translation module 20 such as, for example, a high-level computer language, a machine language, or a computer-interpretable table. As discussed hereinbefore, the output of the translation module 20 may be stored in the translation output database 23.

From block 48, the process flow advances to block 50, where a trigger logic condition is composed by graphically arranging the tiles on the interface 14 according to a pre-defined notation to specify the desired logical relationship for the trigger logic condition using the CCEM 18, as discussed hereinbefore. At block 52, the CCEM 18 recognizes the trigger logic condition based on the arrangement of tiles and the predefined notation. From block 52, the process advances to block 54, where the recognized trigger logic condition is stored in the database 22. At block 56, the translation module 20 translates the recognized trigger logic condition stored in the database 22 to a computer-executable form such as, for example, a high-level computer-language, a machine language, or a computer-interpretable table. As discussed hereinbefore, the output of the translation module 20 may be stored in the translation output database 23. Further, as discussed hereinbefore, the translation module output stored in the database 23 may be downloaded, for example, to an on-board computer of a transportation system for execution by the on-board computer.

Although the present invention has been described herein with respect to certain embodiment, those of ordinary skill in the art will recognize that many modifications and variations of the present invention may be implemented. For example, the CCEM 18 may recognize different notations for defining the logical relationships of the tiles such as, for example, having tiles in a vertical relationship represent an AND relationship and tiles in a horizontal relationship represent an OR relationship. In addition, different notations may be used to represent inversion and precedential relationships. Further, referring to the process flow illustrated in FIG. 9, the determination of whether additional multi-parameter conditions are to be defined may be performed after the condition is translated to a computer-executable form by the translation module 20. Moreover, rather than translating the multi-parameter conditions to a computer-executable form before specification of the trigger logic condition with the CCEM 18, the multi-parameter condition may be translated after specification of the trigger logic conditions. The foregoing description and the following claims are intended to cover all such modifications and variations.

What is claimed is:

1. A system for specifying a multi-parameter condition, comprising:

an interface device; and a simple condition editor module in communication with the interface device for permitting definition of a condition region relative to a multi-dimensional coordinate system via the interface device using a set of attribute commands, and for recognizing the condition associated with the condition region based on the attribute commands used to define the condition region.

2. The system of claim 1, wherein the interface device includes at least one of a monitor, a keyboard, and a mouse.

3. The system of claim 1, wherein the simple condition editor module permits definition of a condition region relative to a two-dimensional coordinate system, and recognizes a two-parameter condition associated with the condition region based on the attribute commands used to define the condition region.

4. The system of claim 1, further comprising a translation module in communication with the simple condition editor module.

5. The system of claim 4, wherein the translation module is for translating the multi-parameter condition recognized by the simple condition editor module to one of a high level computer language, a machine language, and computer-interpretable table.

6. The system of claim 1, wherein the simple condition editor module permits specification of an axis of the multi-dimensional coordinate system via the interface device as one of an absolute axis and a relative axis.

7. The system of claim 1, wherein the simple condition editor module permits specification of the condition region as one of a bounded condition region and an unbounded condition region with respect to a parameter.

8. The system of claim 1, wherein the simple condition editor module permits specification of the condition region via the interface device as one of an unrestricted condition region, an enter condition region, an exit condition region, and an enter/exit condition region.

9. A system for specifying a multi-parameter condition, comprising:
means for graphically defining a condition region relative to a multi-dimensional coordinate system using a set of attribute commands; and
means for recognizing the condition associated with the condition region based on the attribute commands used to graphically define the condition region.

10. The system of claim 9, wherein:
the means for graphically defining includes means for graphically defining the condition region relative to a two-parameter coordinate system; and
the means for recognizing the condition includes means for recognizing a two-parameter condition associated with the condition region based on the attribute commands used to graphically define the condition region.

11. The system of claim 9, further comprising means for translating the recognized condition to one of a high level computer language, a machine language, and a computer-interpretable table.

12. The system of claim 9, wherein the means for graphically defining includes means for specifying an axis of the multi-dimensional coordinate system as one of an absolute axis and a relative axis.

13. The system of claim 9, wherein the means for graphically defining includes means for specifying the condition regions as one of a bounded condition region and an unbounded condition region relative to a parameter.

14. The system of claim 9, wherein the means for graphically defining includes means for specifying the condition region as one of an unrestricted condition region, an enter condition region, an exit condition region, and an enter/exit condition region.

15. A system for specifying a trigger logic condition, comprising:
an interface device; and
a complex condition editor module in communication with the interface device for permitting definition of the trigger logic condition on the interface device as an arrangement of a plurality of tiles defining a logical relationship for the tiles according to a predefined notation, wherein at least one tile represents one of a condition and an action to be performed, and for recognizing the trigger logic condition associated with the arrangement based on the predefined notation.

16. The system of claim 15, wherein the interface device includes at least one of a monitor, a keyboard, and a mouse.

17. The system of claim 15, wherein the predefined notation includes associating a first logical relationship with a pair of horizontally adjacent tiles.

18. The system of claim 17, wherein the predefined notation includes associating a second logical relationship with a pair of vertically adjacent tiles.

19. The system of claim 15, wherein at least one tile represents a multi-parameter condition.

20. The system of claim 19, wherein the multi-parameter condition is a two-parameter condition.

21. The system of claim 15, wherein at least one tile represents a combination of multi-parameter conditions.

22. The system of claim 15, further comprising a translation module in communication with the complex condition editor module.

23. The system of claim 22, wherein the translation module translates the trigger logic condition recognized by the complex condition editor module to one of a high level computer language, a machine language, and a computer-interpretable table.

24. A system for specifying a trigger logic condition, comprising:
means for graphically arranging a plurality of tiles to define a logical relationship representative of the trigger logic condition according to a predefined notation, wherein at least one tile represents one of a condition and an action to be performed; and
means for recognizing the trigger logic condition associated with the arrangement based on the predefined notation.

25. The system of claim 24, wherein the means for graphically arranging includes means for graphically arranging the plurality of tiles with an interface device.

26. The system of claim 24, wherein the means for recognizing includes means for associating a first logical relationship with a pair of horizontally adjacent tiles.

27. The system of claim 26, wherein the means for recognizing includes means for associating a second logical relationship with a pair of vertically adjacent tiles.

28. The system of claim 24, wherein at least one tile represents a multi-parameter condition.

29. The system of claim 28, wherein the multi-parameter condition is a two-parameter condition.

30. The system of claim 24, wherein at least one tile represents a combination of multi-parameter conditions.

31. The system of claim 24, further comprising means for translating the recognized trigger logic condition to one of a high level computer language, a machine language, and a computer-interpretable table.

32. A system for specifying a trigger logic condition, comprising:

an interface device;

a simple condition editor module in communication with the interface device for permitting definition of a condition region relative to a multi-dimensional coordinate system via the interface device using a set of attribute commands, and for recognizing a multi-parameter condition associated with the condition region based on the attribute commands used to define the condition region; and a complex condition editor module in communication with the interface device for permitting definition of the trigger logic condition on the interface device as an arrangement of a plurality of tiles defining a logical relationship for the tiles according to a predefined notation, wherein at least one tile represents one of a multi-parameter condition recognized by the simple condition editor module and an action to be performed, and for recognizing the trigger logic condition associated with the arrangement based on the predefined notation.

33. A system for specifying a trigger logic condition, comprising:

means for graphically defining on an interface device a condition region relative to a multi-dimensional coordinate system using a set of attribute commands;

means for recognizing a multi-parameter condition associated with the condition region based on the set of attribute commands used to define the condition region;

means for graphically arranging a plurality of tiles to define a logical relationship representative of the trigger logic condition according to a predefined notation, wherein at least one tile represents one of a recognized multi-parameter condition and an action to be performed; and means for recognizing the trigger logic condition associated with the arrangement based on the predefined notation.

34. A method for specifying a complex trigger logic condition, comprising:

graphically generating an arrangement of a plurality of tiles according to a predefined notation, wherein at least one tile represents one of a condition and an action to be performed; and recognizing the trigger logic condition associated with the arrangement based on the predefined notation.

35. A method for specifying a multi-parameter condition, comprising:

graphically generating a condition region relative to a multi-dimensional coordinate system with a set of attributes commands for defining the attributes of the condition region; and recognizing the multi-parameter condition associated with the condition region based on the attribute commands used to define the condition region.

36. The method of claim 35, further comprising translating the recognized multi-parameter condition to one of a high level computer language, a machine language, and a computer-interpretable table.

37. The method of claim 35, wherein:

graphically generating includes graphically generating the condition region relative to a two-dimensional coordinate system; and recognizing includes recognizing a two-parameter condition based on the attribute commands used to define the condition region.

38. The method of claim 35, wherein graphically generating includes graphically specifying the condition region as one of bounded and unbounded relative to a parameter.

39. The method of claim 35, wherein graphically generating includes graphically specifying an axis of the multi-dimensional coordinate system as one of a relative axis and an absolute axis.

40. The method of claim 35, wherein graphically generating includes graphically specifying the condition region as one of an unrestricted condition region, an enter condition region, an exit condition region, and an enter/exit condition region.

41. The method of claim 36, further comprising translating the recognized trigger logic condition to one of a high level computer language, a machine language, and a computer-interpretable table.

42. The method of claim 36, wherein recognizing includes associating a first logical relationship to a pair of horizontally adjacent tiles.

43. The method of claim 42, wherein recognizing further includes associating a second logical relationship to a pair of vertically adjacent tiles.

44. A method for specifying a trigger logic condition, comprising:

graphically generating a condition region relative to a two-dimensional coordinate system with a set of attributes commands for defining the attributes of the condition region;

recognizing a two-parameter condition associated with the condition region based on the attribute commands used to define the condition region;

graphically generating an arrangement of a plurality of tiles according to a predefined notation, wherein at least one tile represents one of a recognized two-parameter condition and an action to be performed; and recognizing the trigger logic condition associated with the arrangement based on the predefined notation.

\* \* \* \* \*